United States Patent
Takesue et al.

(12) 
(10) Patent No.: US 6,520,869 B2
(45) Date of Patent: Feb. 18, 2003

(54) RESIN COMPOSITION FOR GOLF BALL AND GOLF BALL

(75) Inventors: Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/860,598

(22) Filed: May 21, 2001

(65) Prior Publication Data

US 2002/0082347 A1 Jun. 27, 2002

(30) Foreign Application Priority Data

Jun. 6, 2000 (JP) .......................... 2000-169261

(51) Int. Cl.$^7$ ........................... C08L 51/00; A63B 37/00
(52) U.S. Cl. ..................... 473/351; 473/371; 473/378; 473/385; 525/70; 525/71; 525/72; 525/78
(58) Field of Search .......................... 525/70, 71, 72, 525/78; 473/351, 371, 378, 385

(56) References Cited

U.S. PATENT DOCUMENTS

| 5,439,227 | A | | 8/1995 | Egashira et al. |
| 5,559,188 | A | | 9/1996 | Egashira et al. |
| 5,824,740 | A | | 10/1998 | Yabuki et al. |
| 5,981,658 | A | * | 11/1999 | Rajagopalan et al. |
| 5,994,470 | A | | 11/1999 | Tanaka et al. |
| 6,034,182 | A | | 3/2000 | Kashiwagi et al. |

FOREIGN PATENT DOCUMENTS

| JP | 6-157843 | 6/1994 |
| JP | 6-299052 | 10/1994 |
| JP | 9-117532 | 5/1997 |

* cited by examiner

*Primary Examiner*—Jeffrey Mullis
(74) *Attorney, Agent, or Firm*—Sughrue Mion, PLLC

(57) ABSTRACT

A resin composition comprising, in admixture, (A) a specific thermoplastic resin composition and (B) a comb-like graft copolymer comprising (b-1) a non-ionomer thermoplastic elastomer as backbone component and (b-2) a polymeric chain containing a non-olefinic monomer as side chain component wherein the weight ratio of (A):(B) is from 99:1 to 40:60 is improved in flow and moldability and thus suitable to form a layer of a golf ball which exhibits improved rebound and durability.

10 Claims, No Drawings

RESIN COMPOSITION FOR GOLF BALL AND GOLF BALL

This invention relates to resin compositions for golf ball having specific comb-like graft copolymers blended therein which have good flow characteristics and moldability. It also relates to high-performance golf balls formed thereof and endowed with outstanding rebound energy and durability.

BACKGROUND OF THE INVENTION

Over the past few years, wide use has been made of ionomer resins in golf ball cover materials. Ionomer resins are ionic copolymers composed of an olefin such as ethylene in combination with an unsaturated carboxylic acid such as acrylic acid, methacrylic acid or maleic acid, wherein the acidic groups are partially neutralized with metal ions such as sodium, lithium, zinc or magnesium ions. They have excellent characteristics such as durability, rebound and scuff resistance, making them highly suitable as the base resin in golf ball cover material.

The golf ball cover materials based on ionomer resins, however, have the drawback that the ball gives a poor feel when hit and lacks a softness necessary to receive an appropriate spin to control the ball in flight. This is because ionomer resins are relatively hard. Upon impact, the ball is not fully pressed against the club head surface and thus gains a less spin rate. The use of harder ionomer resins as the cover stock has the problem that the feel of the ball when hit becomes very hard.

There is a need to have a golf ball having good spin properties and pleasant feel that are attractive to experienced low-handicap golfers and professional golfers.

To improve the hitting feel of ionomer cover materials, a number of proposals have been made on the blending of ionomer resins with thermoplastic elastomers to produce cover materials. The thermoplastic elastomers proposed thus far are olefin elastomers (Japanese Patent No. 2,924,706), polyester elastomers (Japanese Patent No. 2,570,587), styrene elastomers (JP-A 8-182776), polyamide elastomers (JP-A 8-155053), and olefin copolymers (JP-A 11-57071 and 9-117532).

In general, cover materials comprising ionomer resins in admixture with thermoplastic elastomers are good in spin performance as compared with prior art cover materials, but suffer from the drawbacks of low resilience and molding fault due to the limited compatibility between ionomer resins and thermoplastic elastomers.

To improve the compatibility between ionomer resins and thermoplastic elastomers, several techniques have been proposed, for example, grafting of acid anhydride to ionomer resins (JP-A 6-157843 and JP-A 6-299052), blending of glycidyl-modified thermoplastic elastomers (JP-A 8-182776), and addition of a compatibilizing agent having a reactive group such as epoxy or acid anhydride group (JP-A 11-57071).

These techniques intend to improve compatibility by reaction of acid anhydride or glycidyl groups in the thermoplastic elastomers or compatibilizing agent with acid groups in the ionomer resins. When such techniques are applied, however, molecular bonds are formed by heating, resulting in a substantial decrease in flow to interfere with molding. Additionally, reaction by-products can substantially degrade physical properties. For this reason, use of these techniques are not recommended.

SUMMARY OF THE INVENTION

An object of the invention is to provide a resin composition for golf ball comprising a thermoplastic resin and a specific comb-like graft copolymer which has good flow characteristics and moldability so that high-performance golf balls endowed with outstanding rebound energy and durability may be produced therefrom. Another object of the invention is to provide a high-performance golf ball formed thereof and having improved rebound and durability.

The above and other objects are achieved by the resin composition for golf ball and the golf ball defined below. It is noted that the term "enclosure" used in conjunction with the golf ball encompasses the cover and/or the intermediate layer that surrounds the core.

In one aspect, the invention provides a resin composition for golf ball comprising, in admixture, (A) a thermoplastic resin composition comprising at least one thermoplastic resin selected from the group consisting of an olefin-unsaturated carboxylic acid random copolymer, an olefin-unsaturated carboxylic acid-unsaturated carboxylate ternary copolymer, a metal ion-neutralized product of an olefin-unsaturated carboxylic acid random copolymer, and a metal ion-neutralized product of an olefin-unsaturated carboxylic acid-unsaturated carboxylate ternary copolymer, and (B) a comb-like graft copolymer comprising (b-1) a non-ionomer thermoplastic elastomer as backbone component and (b-2) a polymeric chain containing a non-olefinic monomer as side chain component, the thermoplastic resin composition (A) and the comb-like graft copolymer (B) being blended in a weight ratio of from 99:1 to 40:60.

In one preferred embodiment, the thermoplastic resin composition (A) further includes a non-ionomer thermoplastic elastomer. In the comb-like graft copolymer (B), the backbone component (b-1) and the side chain component (b-2) are preferably mixed in a weight ratio of from 99:1 to 40:60. The non-ionomer thermoplastic elastomer in (B) or as the optional component in (A) is preferably an olefin copolymer, an olefin elastomer, a styrene elastomer or a mixture thereof. Also preferably, the side chain component (b-2) contains an unsaturated carboxylic acid as a monomer.

In another aspect, the invention provides a golf ball having a layer formed of a material comprising the resin composition defined above.

A golf ball may also be embodied as comprising a core and a cover formed around the core, the cover being formed of a material comprising the resin composition defined above.

A golf ball may further be embodied as comprising a core and an enclosure formed around the core, the enclosure having a multilayer structure of two or more layers, at least one layer of the enclosure being formed of a material comprising the resin composition defined above.

DESCRIPTION OF PREFERRED EMBODIMENTS

The resin composition for golf ball of the invention is defined as comprising (A) a thermoplastic resin composition and (B) a comb-like graft copolymer in a specific blending ratio.

First referring to the thermoplastic resin composition (A), there is formulated as an essential component at least one thermoplastic resin selected from the group consisting of an olefin-unsaturated carboxylic acid random copolymer, an olefin-unsaturated carboxylic acid-unsaturated carboxylate ternary copolymer, a metal ion-neutralized product of an olefin-unsaturated carboxylic acid random copolymer, and a metal ion-neutralized product of an olefin-unsaturated carboxylic acid-unsaturated carboxylate ternary copolymer.

In these copolymers, the olefin has at least 2 carbons, but not more than 8 carbons, and preferably not more than 6 carbons. Illustrative examples include ethylene, propylene, butene, pentene, hexene, heptene and octene. Ethylene is especially preferred.

Suitable examples of the unsaturated carboxylic acid include acrylic acid, methacrylic acid, maleic acid and fumaric acid. Of these, acrylic acid and methacrylic acid are especially preferred.

The unsaturated carboxylate is preferably a lower alkyl ester of the foregoing unsaturated carboxylic acid. Illustrative examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate or isobutyl acrylate) is especially preferred.

The olefin-unsaturated carboxylic acid random copolymer and olefin-unsaturated carboxylic acid-unsaturated carboxylate ternary copolymer may be prepared by using a known process to carry out copolymerization on the above ingredients in any desired proportion. It is generally recommended that the unsaturated carboxylic acid content within the copolymer be at least 2% by weight, preferably at least 6% by weight, and most preferably at least 8% by weight, but not more than 25% by weight, preferably not more than 20% by weight, and most preferably not more than 15% by weight. A low acid content may lower resilience, whereas a high acid content may lower processability.

The metal ion-neutralized products of olefin-unsaturated carboxylic acid random copolymer and olefin-unsaturated carboxylic acid-unsaturated carboxylate ternary copolymer may be prepared by partially neutralizing acid groups in the above-mentioned random copolymer or ternary copolymer with metal ions. Examples of metal ions which neutralize the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. The use of ions such as $Na^+$, $Li^+$, $Zn^{2+}$ and $Mg^{2+}$ is preferred. The degree of random or ternary copolymer neutralization by these metal ions is not critical.

Such neutralized random or ternary copolymers may be prepared using a method known to the art. For example, suitable compounds of metal ions such as formates, acetates, nitrates, carbonates, hydrogencarbonates, oxides, hydroxides or alkoxides can be introduced onto the aforementioned olefin-unsaturated carboxylic acid random copolymer and olefin-unsaturated carboxylic acid-unsaturated carboxylate ternary copolymer to thereby neutralize the acid groups with the metal ions.

The copolymers and neutralized products thereof in the thermoplastic resin composition (A) are commercially available. Commercial examples of the olefin-unsaturated carboxylic acid random copolymer and olefin-unsaturated carboxylic acid-unsaturated carboxylate ternary copolymer include Nucrel AN4311, AN4318 and AN1560 (all produced by DuPont-Mitsui Polychemicals Co., Ltd.). Illustrative examples of the metal ion-neutralized products of olefin-unsaturated carboxylic acid random copolymer and olefin-unsaturated carboxylic acid-unsaturated carboxylate ternary copolymer include commercial ionomer resins, such as Himilan 1554, 1557, 1601, 1605, 1706, 1855, 1856 and AM7316 (all products of DuPont-Mitsui Polychemicals Co., Ltd.); and also Surlyn 6320, 7930, 8120, 8945 and 9945 (all products of E.I. DuPont de Nemours and Company).

In the thermoplastic resin composition (A), a non-ionomer thermoplastic elastomer may be blended as an optional component in addition to the essential component described above. This optional component is blended, if desired, depending on the type of the essential component in thermoplastic resin composition (A), the type of backbone component (b-1) in comb-like graft copolymer (B), and the amount of comb-like graft copolymer (B) blended.

The non-ionomer thermoplastic elastomer used as the optional component in thermoplastic resin composition (A) is preferably selected from thermoplastic elastomers (other than ionomer resins) which are commonly used as golf ball materials and exhibit by themselves resilience, and flexible thermoplastic resin copolymers which exhibit resilience when blended with ionomer resins. It is noted that the non-ionomer thermoplastic elastomer used herein may be similar to the polymer that constitutes backbone component (b-1) in comb-like graft copolymer (B), and its illustrative examples will be described later in conjunction with (b-1).

In the thermoplastic resin composition (A), one or more species of the copolymers and neutralized products thereof described above as the essential component may be used and, if desired, in combination with the optional component. On the combined use, the essential and optional components are generally blended in a weight ratio of from 95:5 to 40:60, preferably from 90:10 to 50:50, and more preferably from 85:15 to 60:40. If the proportion of the essential component exceeds 95 parts by weight (provided that the amount of essential and optional components combined is 100 parts by weight), the mixture may occasionally become less flowable. If the proportion is below 40 parts by weight, the mixture may be less resilient.

Component (B) is a comb-like graft copolymer comprising (b-1) a non-ionomer thermoplastic elastomer as backbone component and (b-2) a polymeric chain containing a non-olefinic monomer as side chain component. The backbone component (b-1) is preferably selected from thermoplastic elastomers (other than ionomer resins) which are commonly used as golf ball materials and exhibit by themselves resilience, and flexible thermoplastic resin copolymers which exhibit resilience when blended with ionomer resins.

The non-ionomer thermoplastic elastomers used as both the optional component in thermoplastic resin component (A) and the backbone component (b-1) include olefin copolymers, olefin elastomers, urethane elastomers, polyester elastomers, styrene elastomers, and polyamide elastomers. Of these, olefin elastomers and styrene elastomers are preferred for reasons of easy molding, and olefin elastomers are preferred for reasons of cost. Among others, olefin elastomers comprising hard segments composed of polyethylene blocks and soft segments composed of hydrogenated polybutadiene blocks are preferred.

The olefin copolymers include copolymers of α-olefins having 2 to 20 carbon atoms, preferably copolymers obtained by polymerizing two or more monomers including ethylene, such as ethylene-butene copolymers, ethylene-hexene copolymers, ethylene-octene copolymers, and ethylene-butene-hexene copolymers. Commercial products may be used as the olefin copolymer. Commercial examples of ethylene-butene copolymers are EXACT 3024, 3025, 3027, 4011 and 4049; an exemplary ethylene-hexene copolymer is EXACT 3031; and examples of ethylene-butene-hexene copolymers are EXACT 4005 and 5010 (all available from Exxon Chemical Co.). Commercial examples of ethylene-octene copolymer include ENGAGE CL8001, CL8002, CL8003, EG8100, EG8150, EG8200, and EP8500 (Dow Chemical Co.).

The olefin elastomers include polyethylene and polypropylene and are preferably selected from multi-block copolymers comprising hard segments composed of polyethylene blocks and soft segments composed of hydrogenated polybutadiene, hydrogenated polyisoprene, EPDM or EPR blocks, preferably hydrogenated polybutadiene blocks, and crosslinked products thereof. Commercial products may be used as the olefin elastomer. Commercial examples are multi-block copolymers comprising polyethylene blocks and hydrogenated polybutadiene blocks available under the trade name of Dynalon 6100P, E6160P and 6200P (JSR Co., Ltd.).

The styrene elastomers are exemplified by styrene base block copolymers comprising hard segments composed of polystyrene and soft segments composed of hydrogenated polybutadiene, hydrogenated polyisoprene, EPDM or EPR blocks, preferably hydrogenated polybutadiene blocks. Commercial products may be used as the styrene elastomer. Commercial examples are multi-block copolymers comprising styrene blocks and hydrogenated polybutadiene blocks available under the trade name of Toughtec H1042, H1052, H1075, H1031, H1041, H1065 and H1051 (Asahi Chemical Industry Co., Ltd.).

Preferred urethane elastomers are polyester polyurethane multi-block copolymers using aliphatic isocyanate, which are commercially available under the trade name of Pandex T7298, T7890 and T7295 (Dainippon Ink & Chemicals, Inc.). Preferred polyester elastomers are polyether ester multi-block copolymers, which are commercially available under the trade name of Hytrel 4701, 4767, 4001, 4047 and 3046 (Dupont-Toray Polychemicals Co., Ltd.). Polyamide elastomers include multi-block copolymers comprising hard segments composed of polyamide and soft segments composed of polyether or polyester, which are commercially available under the trade name of Pandex 4033, 3533 and 2533 (ATOCHEM).

In the practice of the invention, the non-ionomer thermoplastic elastomer serving as the optional component in thermoplastic resin component (A) and the backbone component (b-1) may be selected from the aforementioned thermoplastic elastomers and used alone or in admixture of any.

As the backbone component (b-1), preference is given to the styrene elastomers, olefin elastomers and olefin copolymers described above. A choice of the backbone component (b-1) is preferably made in the following way. In case where the thermoplastic resin composition (A) contains the optional component, it is recommended to use an elastomer containing the same monomer as in the optional component, especially an elastomer of the same composition as the optional component, because effective mitigation of phase separation of the comb-like graft copolymer (B) from the thermoplastic resin composition (A) is expectable. The monomer used herein is, for example, ethylene, butene, hexene, octene, butadiene or styrene.

In addition to the non-ionomer thermoplastic elastomer as backbone component (b-1), the comb-like graft copolymer (B) has a polymeric chain containing a non-olefinic monomer as side chain component (b-2).

The polymer chain (b-2) includes, for example, polymer chains obtained by polymerizing non-olefinic monomers such as methacrylate, styrene, acrylonitrile and unsaturated carboxylic acids, preferably polymer chains obtained using unsaturated carboxylic acids as one monomer. Such unsaturated carboxylic acids include acrylic acid, methacrylic acid, maleic acid, and fumaric acid, with acrylic acid and methacrylic acid being recommended. A choice of the monomer is preferably made among the same monomers as the monomers constituting the essential component.

Illustrative examples of the side chain component (b-2) include (meth)acrylic acid-methyl (meth)acrylate copolymers, (meth)acrylic acid-ethyl (meth)acrylate copolymers, (meth)acrylic acid-propyl (meth)acrylate copolymers, (meth)acrylic acid-butyl (meth)acrylate copolymers, and poly(meth)acrylates.

It is recommended that the comb-like graft copolymer (B) be free of reactive groups such as epoxy groups or acid anhydride groups which can induce chemical reaction between the thermoplastic resin composition (A) and the comb-like graft copolymer (B). Then the comb-like graft copolymer (B) can serve as a non-reactive compatibilizing agent which does not cause any inconvenience such as a decrease in flow upon heating or degradation of physical properties by reaction by-products.

In the comb-like graft copolymer (B), the backbone component (b-1) and the side chain component (b-2) are generally mixed in a weight ratio of from 99:1 to 40:60, preferably from 95:5 to 50:50, and more preferably from 90:10 to 60:40. If the proportion of component (b-1) exceeds 99 parts by weight (provided that the amount of both the components combined is 100 parts by weight), the copolymer may fail to achieve the effect of improving the flow and moldability. If the proportion of component (b-1) is below 40 parts by weight, there may be a decrease in resilience.

The comb-like graft copolymer (B) may be obtained by grafting the side chain component (b-2) to the backbone component (b-1). The graft polymerization method is not critical. Use may be made of well-known methods, for example, a method of creating initiation seeds on the polymer and polymerizing a monomer therefrom, a method of effecting copolymerization reaction between a macromonomer and a comonomer to form a graft copolymer, and a method of reacting a backbone polymer as (b-1) with a side chain polymer as (b-2).

The graft copolymer (B) thus obtained takes the form of a comb-like molecular structure in which side chain component (b-2) is grafted to backbone component (b-1) via molecular bonds while they are kept immiscible.

In the resin composition for golf ball of the invention, the thermoplastic resin composition (A) and the comb-like graft copolymer (B) are essentially blended in a weight ratio of from 99:1 to 40:60, preferably from 95:5 to 50:50, and more preferably from 90:10 to 60:40. If the proportion of component (A) exceeds 99 parts by weight (provided that the amount of both components (A) and (B) combined is 100 parts by weight), the composition fails to achieve the effects of improving flow and moldability. If the proportion of component (A) is below 40 parts by weight, there is a decrease in resilience.

The resin composition for golf ball of the invention may be prepared by mixing the thermoplastic resin composition (A) with the comb-like graft copolymer (B) in a well-known manner. The preparation method is not critical. For example, the thermoplastic resin composition (A) and the comb-like graft copolymer (B) are mixed in a mixer, typically an internal mixer such as a kneading twin-screw extruder, Banbury mixer or kneader while heating at a temperature of about 150 to 250° C. Depending on a particular application of the composition, suitable additives may be added in the mixing step. In this way, the inventive resin composition is provided as a heated mixture.

In the resin composition for golf ball of the invention, the comb-like graft copolymer (B) serves as a non-reactive compatibilizing agent which does not cause any inconvenience such as a decrease in flow upon heating or degradation of physical properties by reaction by-products. Unlike prior art compatibilizing agents, the comb-like graft copolymer (B) exerts compatibility-improving effects without detracting from resilience because the highly resilient thermoplastic elastomer is included in the backbone. More specifically, the comb-like graft copolymer (B) has a flexible structure as compared with the block copolymers which have heretofore been used as the compatibilizing agent. Additionally, the backbone component (b-1) and/or side chain component (b-2) undergoes intermolecular or ionic interaction with a component in the thermoplastic resin composition (A) so that they are compatibilized through moderate interaction whereby the potential of phase separation is mitigated. The combination of (A) with (B) is effective in forming a composition which is well flowable, moldable, resilient and durable.

The resin composition for golf ball, when processed into a heated mixture, should preferably have a melt index of at least 1.0 dg/min, more preferably at least 1.5 dg/min, and most preferably at least 2.0 dg/min, as measured in accordance with JIS-K6760 at a temperature of 190° C. and under a load of 21 N (2.16 kgf).

Since the resin composition of the invention is effectively flowable and moldable and affords molded parts having improved durability and resilience, it can be widely used in forming high-performance golf balls.

Therefore, the resin composition of the invention is useful as a resin component to form any constituent layer of various golf balls, for example, as cover material, intermediate layer material for multilayer structure golf balls, core material for solid cores or solid centers, and one-piece golf ball material.

Each of these golf ball materials can be obtained by using the above-described resin composition for golf ball as the essential composition and incorporating therein whatever additives if required. For example, where the cover material is prepared, there may be added such additives as pigments, dispersants, antioxidants, ultraviolet absorbers and light stabilizers. For the cover material, these additives may generally be blended in amounts of at least 0.1 part, especially at least 2 parts, and up to 10 parts, especially up to 8 parts by weight per 100 parts by weight of the resin composition for golf ball. The application of the inventive resin composition for golf ball is not limited to the cover material, and it is advantageously applicable as a resinous composition or resinous ingredient in the core material, solid center material, one-piece golf ball material, and intermediate layer material as mentioned above. Depending on a particular application, suitable additives are selected and blended in the resin composition for golf ball in the form of heated mixture.

It is not critical how to blend various additives other than the inventive composition. One exemplary procedure is by blending additives together with the inventive resin composition and then simultaneously heating and mixing them. An alternative procedure is by preheating the inventive resin composition, adding additives thereto, followed by further heating and mixing.

Also contemplated herein is a golf ball having a layer formed of a material comprising the above-described resin composition for golf ball. There are many advantages including good flow and effective molding from the manufacture aspect and improved durability and rebound from the product aspect.

In the golf balls of the invention, the inventive resin composition for golf ball may be used as a compounding component in any of cover material, core material, solid center material, and one-piece golf ball material. Differently stated, the golf balls of the invention encompass wound golf balls (in which the cover may have either a single layer structure or a multilayer structure of two or more layers), one-piece golf balls, two-piece golf balls, three-piece golf balls, and multi-piece golf balls (in which the cover has three or more layers).

Preferred golf balls are those in which the cover or intermediate layer is formed of a material comprising the inventive resin composition for golf ball. Typical are golf balls in which the intermediate layer or cover composed of one or more layers enclosing a conventional core selected in accordance with the type of golf ball to be manufatured is formed of a material based on the inventive resin composition for golf ball. Such layers may be one or more or even all of the outermost cover layer, cover layers other than the outermost layer, and the intermediate layer and not limited thereto.

As mentioned above, the golf balls of the invention may be any of wound golf balls, one-piece golf balls, two-piece golf balls, three-piece golf balls, and multi-piece golf balls (in which the cover has three or more layers). As long as the ball has a layer of a material having the inventive resin composition for golf ball compounded therein, the manufacturing process is not critical and any well-known process may be employed.

Described below as typical examples are a solid golf ball and a wound golf ball in which a cover is formed on a well-known solid core or wound core, using a cover material based on the inventive resin composition for golf ball.

In either case, a core is first prepared by a known method. For example, a solid core may be produced by blending 100 parts by weight of cis-1,4-polybutadiene as base rubber; from 10 to 60 parts by weight of one or more vulcanizing or crosslinking agents selected from among α,β-monoethylenically unsaturated carboxylic acids (e.g., acrylic acid, methacrylic acid) or metal salts thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition is molded by press vulcanization to effect crosslinkage, followed by compression under heating at 140 to 170° C. for a period of 10 to 40 minutes, forming a spherical solid core. The solid core may include a plurality of layers and such a multilayer core may also be produced by a known method.

For the thread-wound golf ball, a wound core is prepared by forming either a liquid or a solid center and winding rubber thread around the center. In the case of a liquid center, a hollow spherical center envelope may be formed from a rubber or thermoplastic elastomer compound, for example, and a liquid filled into this envelope by a well-known method. If a solid center is used instead, the solid center may be produced by the solid core production method described above. Rubber thread is then wound in a stretched state about the center by a known winding method, forming the wound core. Use may be made of rubber thread produced by a conventional method. For example, a rubber composition is prepared by compounding natural rubber or synthetic rubber such as polyisoprene with various additives (e.g., antioxidants, vulcanization accelerators and sulfur), extruded and vulcanized.

In the manufacture of golf balls, the inventive resin composition for golf ball is suitably formulated and processed into a heated mixture suitable as a cover material (for at least one layer in case the cover includes two or more layers) for wound golf balls and solid golf balls, followed by molding in a conventional way.

When a golf ball is manufactured using any one of the above-mentioned cores, a cover material having the inventive resin composition for golf ball compounded therein may be molded over the core to form a cover. Illustratively, a single-layer or multi-layer solid core or wound core prefabricated according to the type of ball to be manufactured is placed in a mold, and the cover material is heated, mixed and melted, then injection-molded over the core.

The method of forming the cover is not limited to the injection molding described above. For example, use may be made of a compression molding method in which a pair of hemispherical cups is molded from the cover material, following which the cups are placed over a core and molded under heat (120 to 170° C.) and pressure for 1 to 5 minutes.

No particular limitation is imposed on the thickness of the cover made of the cover material based on the inventive resin composition for golf ball, although the cover is generally formed to a thickness of at least 1 mm, and preferably at least 1.3 mm, but not more than 4 mm, and preferably not more than 2.3 mm.

In one preferred embodiment of the golf ball according to the invention, the cover in the case of a golf ball comprising a core and a cover formed around the core, or at least one enclosure layer in the case of a golf ball comprising a core and an enclosure formed around the core and having a multilayer structure of two or more layers, is formed of a material having the inventive resin composition for golf ball compounded therein (sometimes referred to as "inventive cover material"). This affords many advantages including good flow and effective molding during the manufacturing process and improved durability and rebound as ball products. Especially in the latter golf ball having an enclosure consisting of two or more layers, the inventive cover material may be used in either the outermost layer or any inside layer. Better results are obtained when the inventive cover material is used in any inside layer rather than the outermost layer. Particularly when the inside layer is formed of the inventive cover material and the outermost layer is formed of a known cover stock as typified by ionomer resin, the inventive inside layer cooperates with the conventional outermost layer in a synergistic manner to provide outstandingly improved durability.

The surface of the cover may have a plurality of dimples formed thereon, and the cover may be administered various treatment such as surface preparation, stamping and painting. In particular, the ease of work involved in administering such surface treatment to a golf ball cover made of the inventive cover material can be improved by the good processability of the cover surface.

In the golf balls manufactured as described above, the diameter, weight, hardness and other parameters of the cover, solid or liquid center, solid core or thread-wound core, and one-piece golf balls, while not subject to any particular limitations, may be adjusted as appropriate, insofar as the objects of the invention are attainable.

The golf ball of the invention may be manufactured for use in tournaments by giving it a diameter and weight which conform with the Rules of Golf. That is, the ball may be produced to a diameter of not less than 42.67 mm and a weight of not greater than 45.93 g.

The resin composition for golf ball of the invention has good flow characteristics and moldability. Since the golf ball of the invention has a layer which is arrived at by making use of a material having the inventive resin composition for golf ball compounded therein, it can be manufactured easily and efficiently, and has excellent rebound and durability.

EXAMPLE

Examples of the invention and comparative examples are given below by way of illustration, and are not intended to limit the invention.

Examples 1–5 and Comparative Examples 1–7

Using a core material composed primarily of cis-1,4-polybutadiene, a solid core A was produced having a diameter of 38.6 mm, a weight of 35.0 g, and a deflection of 3.2 mm under a load of 981 N (100 kgf).

Cover materials of the compositions shown in Table 1 were mixed at 200° C. with a kneading-type twin-screw extruder and prepared in the form of pellets. In each of the examples, the cover material was injected into a mold in which the solid core A prepared above had been placed, giving a two-piece solid golf ball having a cover of 2.1 mm thick and a diameter of 42.8 mm.

The golf balls were examined for several characteristics by the following methods. The results are shown in Tables 1 and 2.

Melt Flow Rate:

The melt flow rate of the resin composition was measured in accordance with JIS-K6760 at a temperature of 190° C. and under a load of 21 N (2.16 kgf).

Reject Rate of Injection Molding

By operating an ordinary injection molding machine used in the golf ball manufacture in a conventional manner, each of the cover materials of Examples 1–5 and Comparative Examples 1-7 and the intermediate layer materials of Examples 6 and Comparative Example 8 was molded, 100 shots each. A reject rate was calculated.

Reject Rate of Spherical Surface Buff

By operating an ordinary spherical surface buffing machine used in the golf ball manufacture in a conventional manner, each of the golf balls covered with the cover materials of Examples 1–5 and Comparative Examples 1–7 and the intermediate products covered with the intermediate materials of Examples 6 and Comparative Example 8 was buffed on its spherical surface. A reject rate was calculated.

Ball Hardness:

Measured as the deflection (in millimeters) of the ball under a load of 981 N (100 kgf).

Initial Velocity:

Measured using the same type of initial velocity instrument as approved by the United States Golf Association (USGA), and in accordance with USGA rules.

Durability Index:

Using a flywheel hitting machine, the balls were repeatedly hit at a head speed of 38 m/s. The number of hits repeated until ball failure is reported as a relative value based on 100 for Comparative Example 1.

Trade names and materials mentioned in the tables are described below.

Surlyn 8945: sodium ion-neutralized ethylene-methacrylic acid copolymer with an acid content of 15 wt %, E.I. DuPont de Nemours and Company Surlyn 9945: zinc ion-neutralized ethylene-methacrylic acid copolymer with an acid content of 15 wt %, E.I. DuPont de Nemours and Company Himilan 1706: zinc ion-neutralized ethylene-methacrylic acid copolymer with an acid content of 15 wt %, DuPont-Mitsui Polychemicals Co., Ltd.

Himilan 1605: sodium ion-neutralized ethylene-methacrylic acid copolymer with an acid content of 15 wt %, DuPont-Mitsui Polychemicals Co., Ltd.

Modiper A1200: comb-like graft copolymer in the form of low density polyethylene having polymethyl methacrylate copolymer added thereto, PMMA/LDPE blend ratio: 70/30, NOF Corp.

Toughtec H1041: styrene elastomer having hard segments of polystyrene and soft segments of hydrogenated polybutadiene, Asahi Chemical Industry Co., Ltd.

Dynalon 6100P: olefin elastomer having hard segments of polyethylene and soft segments of hydrogenated polybutadiene, JSR Co., Ltd.

Nofalloy AS200: comb-like graft copolymer in the form of styrene base block copolymer having polymethacrylate resin added thereto, NOF Corp.

Nofalloy AT884: comb-like graft copolymer in the form of Dynalon 6100P having methacrylic acid-methyl methacrylate copolymer added thereto, Dynalon 6100P/methacrylic acid-methyl methacrylate copolymer=80/20, NOF Corp.

Elvalloy AS: ethylene-acrylate-glycidyl methacrylate ternary copolymer, DuPont-Mitsui Polychemicals Co., Ltd.

Umex 2000: maleic anhydride-modified polyethylene, Sanyo Chemicals Co., Ltd.

TABLE 1

| | | | Example | | | | |
|---|---|---|---|---|---|---|---|
| | | | 1 | 2 | 3 | 4 | 5 |
| Core | | | A | A | A | A | A |
| Cover material composition | Component (A), essential | Surlyn 8945 | 35 | 35 | 35 | | 35 |
| | | Surlyn 9945 | 35 | 35 | 35 | | 35 |
| | | Himilan 1706 | | | | 35 | |
| | | Himilan 1605 | | | | 35 | |
| | Component (A), optional | Dynalon 6100P | 20 | 10 | | | |
| | | Engage EG8200 | | | | 20 | |
| | | Toughtec H1041 | | | | | 20 |
| | Component (B) | Nofalloy AT884 | 10 | 20 | 30 | 10 | |
| | | Nofalloy AS200 | | | | | 10 |
| | Other | Titanium dioxide | | 4 | 4 | 4 | 4 |
| Resin composition physical properties | Melt flow rate (dg/min) | | 3.1 | 3.5 | 4.2 | 3.5 | 3.1 |
| | Cover hardness (Shore D) | | 56 | 56 | 56 | 54 | 56 |
| Moldability | Injection reject rate (%) | | 0 | 0 | 0 | 0 | 0 |
| | Buffing reject rate (%) | | 0 | 0 | 0 | 0 | 0 |
| Ball physical properties | Weight (g) | | 45.2 | 45.2 | 45.2 | 45.2 | 45.2 |
| | Hardness (mm) | | 2.95 | 2.95 | 2.95 | 3.05 | 2.95 |
| | Initial velocity (m/s) | | 77.3 | 77.3 | 77.3 | 77.2 | 77.3 |
| | Durability index | | 164 | 185 | 201 | 148 | 152 |

TABLE 2

| | | | Comparative Example | | | | | | |
|---|---|---|---|---|---|---|---|---|---|
| | | | 1 | 2 | 3 | 4 | 5 | 6 | 7 |
| Core | | | A | A | A | A | A | A | A |
| Cover material composition | Component (A), essential | Surlyn 8945 | 35 | 35 | 35 | 35 | | | 35 |
| | | Surlyn 9945 | 35 | 35 | 35 | 35 | | | 35 |
| | | Himilan 1706 | | | | | 35 | 35 | |
| | | Himilan 1605 | | | | | 35 | 35 | |
| | Component (A), optional | Dynalon 6100P | 30 | 25 | 25 | 20 | | | |
| | | Engage EG8200 | | | | | 30 | 25 | |
| | | Toughtec H1042 | | | | | | | 20 |
| | Other | Elvalloy AS | | 5 | | | | 5 | |
| | | Umex 2000 | | | 5 | | | | |
| | | Modiper A1200 | | | | 10 | | | |
| | | Epoflend AT014 | | | | | | | 10 |
| | | Titanium dioxide | 4 | 4 | 4 | 4 | 4 | 4 | 4 |
| Resin composition physical properties | Melt flow rate (dg/min) | | 2.4 | 0.8 | 1.9 | 2.8 | 3.0 | 0.8 | 0.7 |
| | Cover hardness (Shore D) | | 56 | 56 | 56 | 60 | 54 | 54 | 56 |
| Moldability | Injection reject rate (%) | | 0 | 28 | 0 | 0 | 0 | 32 | 14 |
| | Buffing reject rate (%) | | 100 | 24 | 33 | 8 | 100 | 25 | 2 |
| Ball physical properties | Weight (g) | | 45.2 | 45.2 | 45.2 | 45.2 | 45.2 | 45.2 | 45.2 |
| | Hardness (mm) | | 2.95 | 2.95 | 2.95 | 2.75 | 3.05 | 3.05 | 2.95 |
| | Initial velocity (m/s) | | 77.2 | 77.1 | 77.1 | 76.8 | 77.1 | 77.0 | 77.1 |
| | Durability index | | 100 | 110 | 108 | 96 | 85 | 92 | 105 |

Engage EG8200: ethylene-octene copolymer, Dow Chemical Company

Epofriend AT014: epoxy addition product of styrene base block copolymer, Daicel Chemical Industries, Ltd.

As is evident from Tables 1 and 2, a comparisons of the golf ball of Examples 1–5 using the inventive resin composition for golf balls as cover material with the golf balls of Comparative Examples 1–7 using prior art cover materials shows that the inventive resin compositions as cover material are well flowable and effectively moldable and the inventive golf balls have high rebound and long-wearing properties.

Example 6 and Comparative Example 8

Using a core material composed primarily of cis-1,4-polybutadiene, a solid core B was produced having a diameter of 36.4 mm, a weight of 30.9 g, and a deflection of 4.0 mm under a load of 981 N (100 kgf).

The intermediate layer material shown in Table 3 was injection molded around the solid core B to a thickness of 1.7 mm. The outer layer material (cover material) shown in Table 3 was injection molded therearound to a thickness of 2 mm, giving a three-piece solid golf ball having a diameter of 42.8 mm.

The golf balls were examined by the same methods as above. The results are shown in Table 3.

TABLE 3

|  |  |  | Example 6 | Comparative Example 8 |
|---|---|---|---|---|
| Core |  |  | B | B |
| Intermediate layer composition | Component (A), essential | Surlyn 8945 | 35 | 35 |
|  |  | Surlyn 9945 | 35 | 35 |
|  | Component (A), optional | Dynalon 6100P | 20 | 25 |
|  | Component (B) | Nofalloy AT884 | 10 |  |
|  | Other | Elvalloy AS |  | 5 |
|  |  | Titanium dioxide | 4 | 4 |
| Intermediate layer | Thickness (mm) |  | 1.7 | 1.7 |
| Outer layer composition | Himilan 1605 |  | 50 | 50 |
|  | Himilan 1706 |  | 50 | 50 |
|  | Titanium dioxide |  | 4 | 4 |
| Outer layer | Thickness (mm) |  | 1.5 | 1.5 |
| Intermediate layer composition physical properties | Melt flow rate (dg/min) |  | 3.1 | 0.8 |
|  | Hardness (Shore D) |  | 56 | 56 |
| Intermediate layer moldability | Injection reject rate (%) |  | 0 | 45 |
|  | Buffing reject rate (%) |  | 0 | 0 |
| Ball physical properties | Weight (g) |  | 45.2 | 45.2 |
|  | Hardness (mm) |  | 2.70 | 2.70 |
|  | Initial velocity (m/s) |  | 77.2 | 77.2 |
|  | Durability index |  | 233 | 142 |

As is evident from Table 3, a comparison of the multi-piece golf ball of Example 6 using the inventive resin composition for golf ball as intermediate layer material with the golf ball of Comparative Example 8 using prior art intermediate layer and cover materials shows that the inventive resin composition as intermediate layer material is well flowable and effectively moldable and the inventive golf balls are improved in rebound and durability.

Japanese Patent Application No. 2000-169261 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A resin composition for golf ball comprising, in admixture, (A) a thermoplastic resin composition comprising at least one thermoplastic resin selected from the group consisting of an olefin-unsaturated carboxylic acid random copolymer, an olefin-unsaturated carboxylic acid-unsaturated carboxylate ternary copolymer, a metal ion-neutralized product of an olefin-unsaturated carboxylic acid random copolymer, and a metal ion-neutralized product of an olefin-unsaturated carboxylic acid-unsaturated carboxylate ternary copolymer, and (B) a comb graft copolymer comprising (b-1) a non-ionomer thermoplastic elastomer as backbone component and (b-2) a polymeric chain containing a non-olefinic monomer as side chain component, said thermoplastic resin composition (A) and said comb graft copolymer (B) being blended in a weight ratio of from 99:1 to 40:60.

2. The resin composition of claim 1 wherein said thermoplastic resin composition (A) is an ionomer resin and further a non-ionomer thermoplastic elastomer is added to the thermoplastic resin composition (A).

3. The resin composition of claim 1 wherein the non-ionomer thermoplastic elastomer is at least one member selected from the group consisting of an olefin copolymer, an olefin elastomer, and a styrene elastomer.

4. The resin composition of claim 2, wherein the side chain component (b-2) is selected from the group of (meth)acrylic acid-methyl (meth)acrylate copolymers, (meth)acrylic acid-ethyl (meth)acrylate copolymers, (meth)acrylic acid-propyl (meth)acrylate copolymers, (meth)acrylic acid-butyl (meth)acrylate copolymers, and poly(meth)acrylates.

5. The resin composition of claim 1 wherein in said comb graft graft copolymer (B), the backbone component (b-1) and the side chain component (b-2) are combined in a weight ratio of from 99:1 to 40:60.

6. The resin composition of claim 1, wherein the non-ionomer thermoplastic elastomer is at least one member selected from the group consisting of an olefin copolymer, an olefin elastomer, and a styrene elastomer.

7. The resin composition of claim 1 wherein the side chain component (b-2) contains an unsaturated carboxylic acid as a monomer.

8. A golf ball having a layer formed of a material comprising the resin composition of claim 1.

9. A golf ball comprising a core and a cover formed around the core, the cover being formed of a material comprising the resin composition of claim 1.

10. A golf ball comprising a core and an enclosure formed around the core, the enclosure having a multilayer structure of two or more layers, at least one layer of said enclosure being formed of a material comprising the resin composition of claim 1.

* * * * *